UNITED STATES PATENT OFFICE.

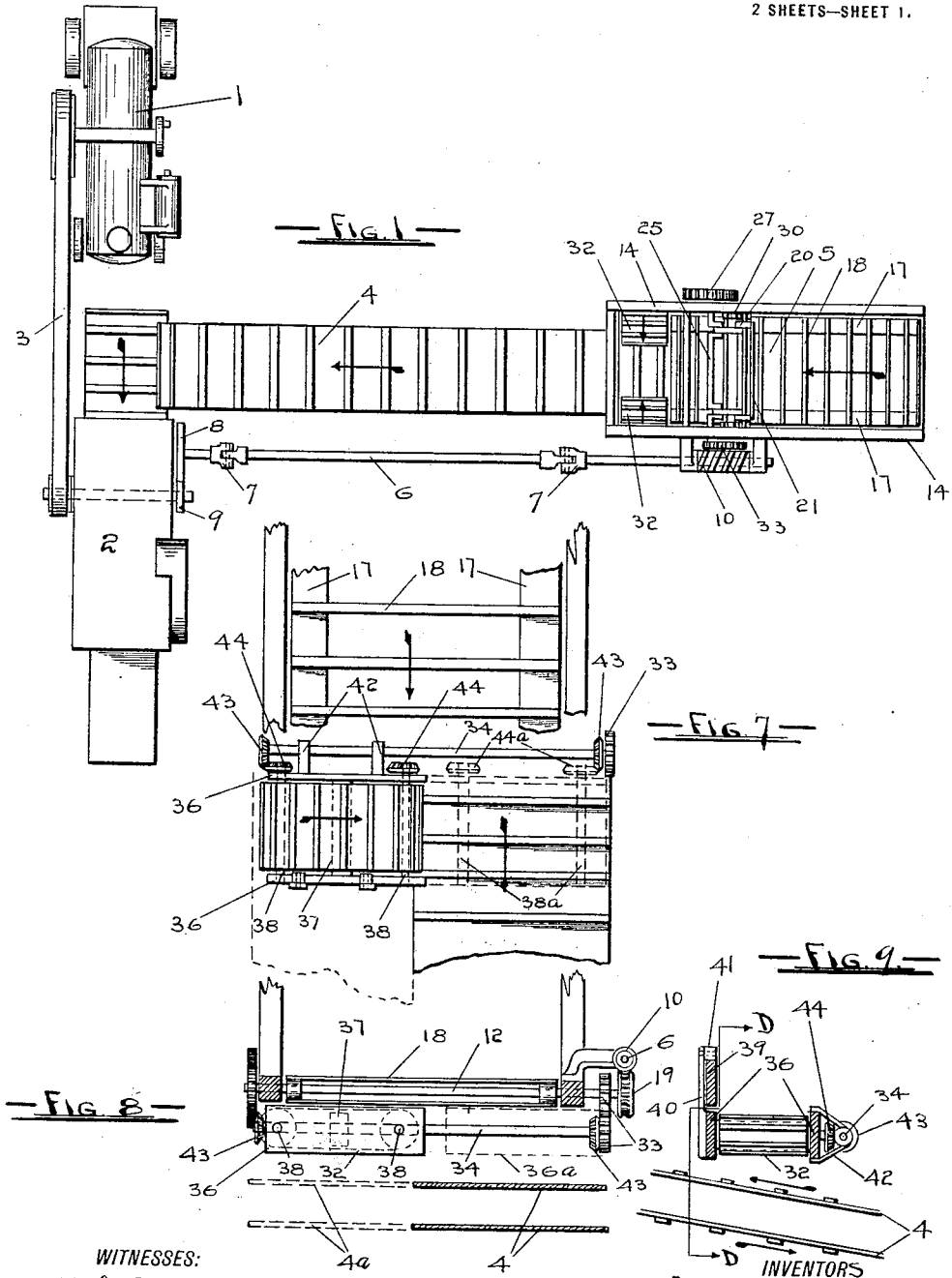

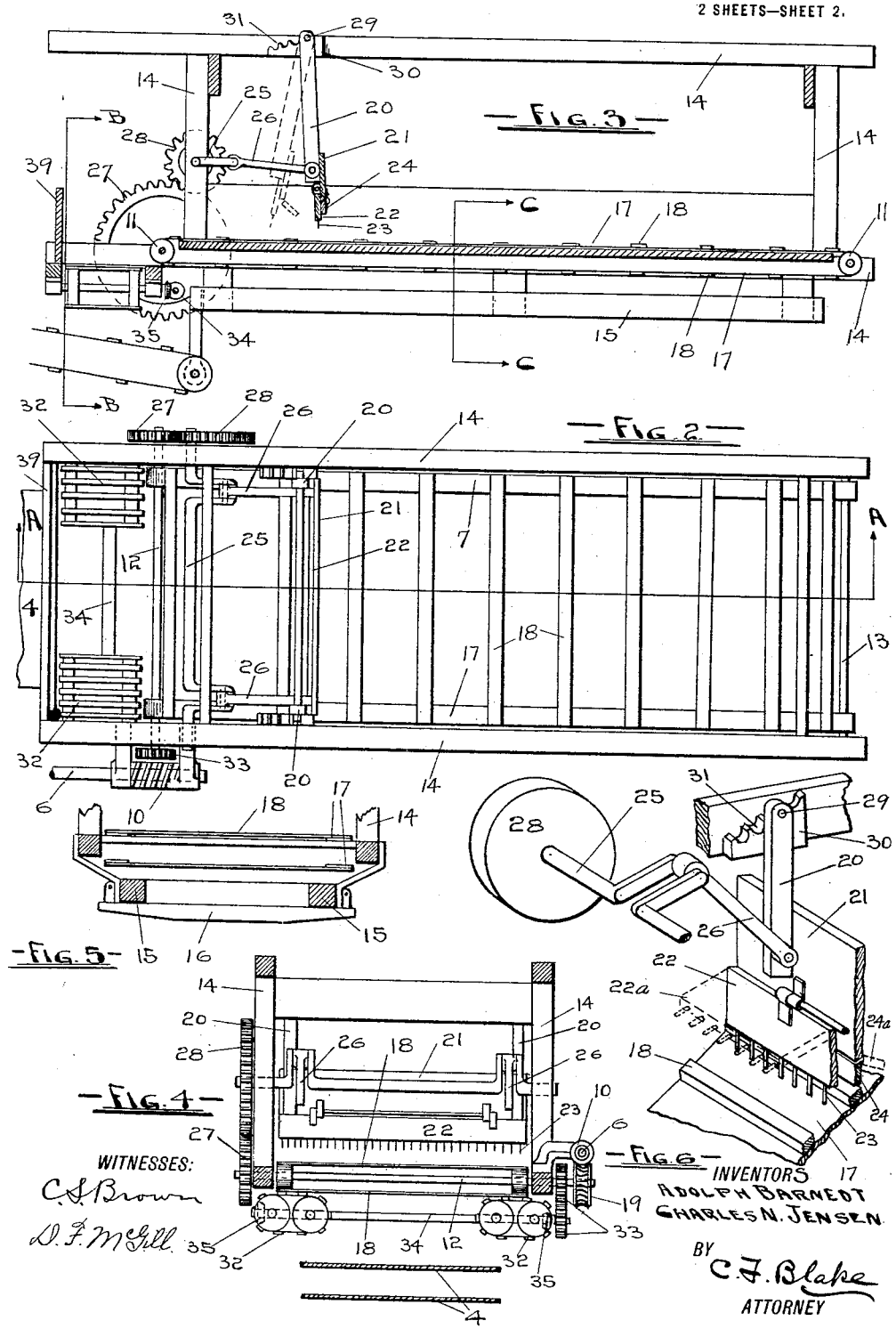

ADOLPH BARNEDT AND CHARLES N. JENSEN, OF BICKLETON, WASHINGTON.

FEEDER FOR THRESHING-MACHINES.

1,196,070.

Specification of Letters Patent.   Patented Aug. 29, 1916.

Application filed December 20, 1915.   Serial No. 67,866.

*To all whom it may concern:*

Be it known that we, ADOLPH BARNEDT and CHARLES N. JENSEN, citizens of the United States, residing at Bickleton, county of Klickitat, State of Washington, have invented certain new and useful Improvements in Feeders for Threshing-Machines, of which the following is a specification.

Our invention relates to devices for feeding hay, grass or grain headings to agricultural implements, and especially to that class of such devices as adapted to feed grain headings to threshing machines.

The object of our invention is to provide such a device as will receive the material in bulk and distribute same in small portions to the threshing elevator.

We accomplish the above object and other useful and desirable results by means of the construction described herein and illustrated in the accompanying drawings which therefore become a part of this application for Letters Patent, and in which;

Figure 1 is a plan view of our invention shown in working position with a thresher and traction engine. Fig. 2 is a plan view of our invention upon an enlarged scale. Fig. 3 is a longitudinal sectional elevation upon line A A of Fig. 2. Fig. 4 is a transverse sectional elevation upon line B B of Fig. 3. Fig. 5 is a transverse section upon line C C of Fig. 3. Fig. 6 is a fragmentary perspective view of the working parts of our invention. Fig. 7 is a plan view of a modified construction. Fig. 8 is a transverse sectional elevation upon line D D of Fig. 9. Fig. 9 is a longitudinal sectional elevation of Fig. 8.

Like characters of reference indicate like parts throughout the several views of the drawings, in which;—

Numeral 1 is the traction engine shown in Fig. 1 as driving the thresher 2 by means of belt 3; the thresher elevator 4 and the novel raking and feeding means 5. The said raking and feeding means is operated from the thresher in any convenient manner as by a belt and mule pulleys, rope transmission, etc. As one convenient means of operation we have illustrated a tumbler shaft 6 having therein universal joints 7, and connecting gears 8 and 9 upon the thresher with worm 10 upon our invention.

In general our invention consists of a frame work within which is operated a continuously moving feed table and above said feed table a pivotally mounted feed bar of novel construction to be here-in-after described, the function of said feed bar being to govern and regulate the amount of material passed by said feed table to the thresher elevator.

The feed table is carried upon rollers 11 mounted upon cross shafts 12 and 13, said shafts being rotatably mounted upon convenient members of the general frame 14. The frame 14 is composed of timbers or other suitable and convenient material, and is mounted upon skids 15 adapted to rest upon the bolsters 16 of a wagon, as shown in Fig. 5. The material (grain headings) to be threshed is deposited within the frame, which may be formed crib shaped if desired, upon the feed table. Said feed table is composed of flexible members 17, which may be belts, chains or other suitable material, connected by slats or flights 18. The forward feed table shaft 12 is operated from worm 10 by means of worm gear 19 as shown in Fig. 4.

The feed bar consists of pivotally supported hangers 20 cross connected by a substantially vertically disposed member 21, the function of which is to retard the passage of the material upon the feed table. Pivotally attached to said member 21 is a rake member 22 having teeth 23 there-in, said teeth being substantially vertical and immediately above said feed table. The function of said rake is to allow a small portion of the material to pass beneath same, and then to seize same and disentangle it from the mass of material upon the feed table. In order that said rake may perform this function an oscillatory motion is imparted to the same such that the speed of the teeth 23 may be greater than that of the feed table, and thus upon each forward movement of said rake a small portion of material is torn loose from the bulk and carried forward. In order that said fork may be enabled to engage the material upon the feed table it is pivotally attached to member 21, and there-by allowed to swing outward and upward upon each rearward movement of the feed bar, as shown at 22ª in Fig. 6, returning to its initial position when the forward movement of the feed bar commences, and thereby engaging a small portion of the material between the teeth 23 and the adjacent feed table.

In order that the member 21 of the feed bar may not upon the forward movement of same become choked up with any portion of the material between same and the feed table, we provide a portion 24 hinged to member 21 at the lower portion thereof adjacent the feed table as shown in Figs. 3 and 6. If such choking occurs because of too much material accumulating between member 24 and the feed table when the feed table bar is upon its forward movement said member 24 will assume a position as at 24ª, Fig. 6, and thus relieve the congestion. Upon the rearward movement of the feed bar portion 24 returns to its initial position and pushes backward the material upon the feed table, thus insuring that only a small portion of the material shall be delivered to the rake teeth 23.

By means of the above described construction and operation of the feed bar the material upon the feed table is delivered to the thresher elevator 4 in small portions irrespective of the amount of material upon the feed table in the rear of the feed bar.

To operate the feed bar reciprocatingly we provide a crank shaft 25 pivotally connected to hangers 20 by means of connecting rods 26, said crank shaft being geared to shaft 12 by means of gears 27 and 28 the gear ratio being such as will insure the proper relative speeds of the feed bar and the feed table.

To enable adjustment of the space separating teeth 23 from the feed table slats 18 to be made we provide as a seat for pivot pins 29 a member 30 having a series of corrugations 31 upon the upper edge thereof each such corrugation being adapted to receive said pivot pin 29, and the corrugations being disposed upon an incline relative to the feed table, as shown in Figs. 3 and 6.

To insure the depositing of the material upon the elevator 4 after same has left the feed table, and that no material is spilled off of said elevator upon either side thereof, we provide transverse feed tables 32, each located upon one side of the main feed table before mentioned and adjacent the forward end thereof, said transverse feed tables being of construction similar to that of the main feed table, and operated from shaft 12 by means of spur gears 33, shaft 34 and bevel gears 35.

A modified form of transverse feed table is illustrated in Figs. 7, 8, and 9, wherein one transverse feed table only is used, the same being constructed to shift from one side to the other of the frame and thus allow the thresher elevator to be placed upon either the right or left side of our invention as circumstances may render convenient in the field. In this modified construction it becomes necessary to provide means for shifting the transverse feed table as well as means for reversing the direction of motion of same. In order to shift transverse feed table we mount same within a frame consisting of side members 36 and cross member 37 connecting said side members, side members being adapted to receive the feed table shafts 38, as shown in Figs. 7 and 8. One of said side members is hung from a transverse member 39 of the main frame of the structure by means of hangers 40 having rollers 41 adapted to operate upon said member 39, as shown in Fig. 9. The opposite side member 36 is supported from shaft 34 by means of brackets 42 adapted to slide longitudinally of said shaft, as shown in Figs. 7 and 9. By means of this construction frame 36 containing the transverse feed table 32 may be placed at either side of our invention as shown at 36 and 36ª in Fig. 8, which allows the thresher elevator to be placed at either side as shown at 4 and 4ª in Fig. 8. To reverse the direction of motion of the transverse feed table when thus moved from one position to the other, we provide a pair of bevel gears 43 upon shaft 34, each of said bevel gears being adapted to mesh with one of a pair of bevel gears 44, said bevel gears 44 being each mounted upon one of the transverse feed table shafts 38, as shown in Fig. 7. By means of this construction the transverse feed table is operated from one of said bevel gears 44 when it is in the right hand position, and from the other bevel gear 44 when it is in the left hand position, one of said bevel gears 44 always being idle, the two positions of said bevel gears and their shafts being shown at 38 and 44 and at 38ª and 44ª in Fig. 7.

The motion of the upper portion of transverse feed table 32 is always toward the center of the structure for the purpose of keeping the material away from the sides of the thresher elevator 4 and depositing same upon the center of said elevator.

Our invention may be made of any size and constructed of any material deemed convenient and suitable for a device of this character, and while we have illustrated and described a form of construction and general arrangement of parts found desirable in materializing our invention, we wish to include in this application for Letters Patent all mechanical equivalents or substitutes that may fairly be considered to come with-in the scope and purview of our invention as defined in the appended claims.

Having disclosed our invention so that others skilled in the art may be enabled to construct and use same, what we claim as new and desire to secure by Letters Patent is:—

1. In a device for feeding grain headings in bulk to a threshing machine; a main frame; a feed table longitudinally disposed and operated within said main frame; a pivotally supported oscillating feed bar transversely disposed adjacent said feed table; a rake bar hinged to said feed bar and having rake teeth thereon adjacent said feed table; means to operate said feed table; and means to operate said feed bar.

2. In a device for feeding grain headings in bulk to a threshing machine; a main frame; a feed table longitudinally disposed and operated within said main frame; a pivotally supported oscillating feed bar transversely disposed adjacent said feed table; a bar hinged to said feed bar at the edge thereof adjacent said feed table and adapted to lie in the plane of said feed bar upon the rearward motion of same, and to swing at an angle to said feed bar upon the forward motion of same; means to operate said feed bar; and means to operate said feed table.

3. In a device for feeding grain headings in bulk to a threshing machine; a main frame; a feed table longitudinally disposed and operated within said frame; and a pivotally supported oscillating feed bar adjacent said feed table; in combination with means for adjusting the distance between said feed table and said feed bar.

4. In a device for feeding grain headings in bulk to a threshing machine; a main frame; a feed table longitudinally disposed and operated within said frame; a pivotally supported oscillating feed bar transversely disposed adjacent said feed table; a rake bar hinged to said feed bar and having rake teeth thereon adjacent said feed table; a bar hinged to said feed bar at the edge thereof adjacent said feed table; means to adjust the distance between said feed bar and said feed table; means to operate said feed table; and means to operate said feed bar.

5. In a device for feeding grain headings in bulk to a threshing machine; a threshing machine elevator in combination with a main frame adapted to receive said grain headings in bulk; means for feeding said bulk toward said elevator; a pivotally supported feed bar comprising a transverse member, a member hinged to the lower edge of said transverse member adjacent said feeding means, and a rake member pivotally mounted upon said transverse member adjacent said feeding means; means for operating said feed bar; and means for depositing small portions of said grain headings upon said elevator.

6. In a device for feeding grain headings in bulk to a threshing machine; a threshing machine elevator in combination with a main frame adapted to receive said grain headings in bulk; a feed table longitudinally disposed and operated within said main frame and adapted to feed said bulk toward said elevator; a pivotally supported feed bar transversely disposed above and adjacent to said feed table, a member hinged to said feed bar and adapted to prevent said bulk from being deposited upon said elevator; a rake member hinged to said feed bar and adapted to remove small portions from said bulk and pass same toward said elevator; means to adjust the intervening distance between said feed table and said feed bar; means to deposit said small portions from said feed bar upon the center portion of said elevator; means to operate said feed table; and means to operate said feed bar.

In witness whereof we claim the foregoing as our own we hereunto affix our signatures in the presence of two subscribing witnesses.

ADOLPH BARNEDT.
CHAS. N. JENSEN.

Witnesses:
WILL G. FAULKNER,
A. D. MASON.

Copies of this patent may be obtained for five cents each, by addressing the "Commissioner of Patents, Washington, D. C."